(12) United States Patent
Lindblad

(10) Patent No.: US 11,703,101 B2
(45) Date of Patent: Jul. 18, 2023

(54) ELECTRONICALLY CONTROLLED VALVE FOR A SHOCK ABSORBER

(71) Applicant: ÖHLINS RACING AB, Upplands Väsby (SE)

(72) Inventor: Geir Lindblad, Märsta (SE)

(73) Assignee: ÖHLINS RACING AB, Upplands Väsby (SE)

( * ) Notice: Subject to any disclaimer, the term of this patent is extended or adjusted under 35 U.S.C. 154(b) by 624 days.

(21) Appl. No.: 16/696,521

(22) Filed: Nov. 26, 2019

(65) Prior Publication Data
US 2020/0096075 A1    Mar. 26, 2020

Related U.S. Application Data

(63) Continuation of application No. PCT/EP2018/064515, filed on Jun. 1, 2018.

(30) Foreign Application Priority Data

Jun. 1, 2017  (EP) .................................... 17174115

(51) Int. Cl.
    *F16F 9/46*     (2006.01)
    *F16K 11/07*    (2006.01)
    *F16K 31/06*    (2006.01)

(52) U.S. Cl.
    CPC .............. *F16F 9/469* (2013.01); *F16F 9/461* (2013.01); *F16K 11/0716* (2013.01); *F16K 31/0613* (2013.01)

(58) Field of Classification Search
    CPC .... F16F 9/46; F16F 9/461; F16F 9/465; F16F 9/466; F16F 9/469
    (Continued)

(56) References Cited

U.S. PATENT DOCUMENTS 4,754,855 A * 7/1988 Kuwana ................... F16F 9/462
                                                        74/526
4,765,446 A * 8/1988 Murata .................... F16F 9/468
                                                      188/282.4
(Continued)

FOREIGN PATENT DOCUMENTS

DE      4107599 A  *  9/1992  ............. B60G 17/08
DE      4107600 A1 *  9/1992  ............. F16F 9/465
(Continued)

OTHER PUBLICATIONS

International Search Report for International Application No. PCT/EP2018/064515, dated Sep. 28, 2018 (2 pages).
(Continued)

*Primary Examiner* — Thomas J Williams
(74) *Attorney, Agent, or Firm* — Kagan Binder, PLLC

(57) ABSTRACT

An electrically controlled valve for a shock absorber. The valve comprises a piston providing a primary fluid channel for damping fluid and a housing in which a piston holder is provided with an internal secondary fluid channel for damping fluid. Fluid flow (23) through the secondary fluid channel for damping fluid. Fluid flow through the secondary fluid channel is controlled by a spool movable within the piston holder wherein the movement of the spool is enabled by an electrically controlled actuator. Fluid flow through the secondary fluid channel is controlled by restriction at the inlet of the secondary fluid channel the inlet comprising one or more radial holes through the piston holder.

15 Claims, 7 Drawing Sheets

(58) Field of Classification Search
USPC .......................................... 188/282.8, 299.1
See application file for complete search history.

(56) References Cited

U.S. PATENT DOCUMENTS

| | | | | |
|---|---|---|---|---|
| 5,316,114 | A * | 5/1994 | Furuya | B60G 17/08 188/282.4 |
| 5,522,484 | A * | 6/1996 | Sawai | F16F 9/46 188/282.2 |
| 5,690,195 | A * | 11/1997 | Kruckemeyer | F16F 9/368 188/282.5 |
| 5,706,919 | A * | 1/1998 | Kruckemeyer | F16F 9/466 188/282.5 |
| 6,161,662 | A * | 12/2000 | Johnston | F16F 9/5123 188/282.3 |
| 6,371,262 | B1 * | 4/2002 | Katou | F16F 9/465 188/266.5 |
| 6,491,146 | B1 * | 12/2002 | Yi | F16F 9/44 188/322.15 |
| 6,837,344 | B2 * | 1/2005 | Miller | F16F 9/461 188/282.3 |
| 8,950,559 | B2 * | 2/2015 | de Kock | F16F 9/5126 188/322.22 |
| 9,273,746 | B2 * | 3/2016 | Chen | F16F 9/512 |
| 2012/0048400 | A1 * | 3/2012 | Schudt | F15B 13/0442 137/528 |
| 2016/0200163 | A1 | 7/2016 | Tsukahara | |
| 2017/0082169 | A1 | 3/2017 | Kim | |

FOREIGN PATENT DOCUMENTS

| | | | | |
|---|---|---|---|---|
| DE | 102008053092 A1 * | 4/2010 | | B62K 25/08 |
| DE | 102010039918 A1 * | 3/2012 | | F16H 61/0251 |
| EP | 0322608 A2 | 7/1989 | | |
| FR | 2721670 A1 * | 12/1995 | | F16F 9/466 |
| JP | 2008039065 A | 2/2008 | | |
| JP | 2010084923 A | 4/2010 | | |
| JP | 2010266038 A * | 11/2010 | | F16K 31/0613 |
| JP | 2012149717 A | 8/2012 | | |
| WO | 2010002314 A1 | 1/2010 | | |

OTHER PUBLICATIONS

English Translation of Japanese Office Action for Japanese Application No. 2019-566346, dated Apr. 19, 2022, (6 pages).
E-Space English Abstract and Machine Translation for JP2008039065A.
E-Space English Abstract and Machine Translation for JP2010084923A.
E-Space English Abstract and Machine Translation for JP2012149717A.

* cited by examiner

ELECTRONICALLY CONTROLLED VALVE FOR A SHOCK ABSORBER

CROSS REFERENCE TO THE RELATED APPLICATION

This application is a continuation application, under 35 U.S.C. § 111(a), of international application No. PCT/EP2018/064515, filed on Jun. 1, 2018, which claims priority on European Patent Application No. 17174115.0 filed on Jun. 1, 2017, the entire content of both of which are incorporated herein as a part of the application.

BACKGROUND

Some modern shock absorbers are provided with electronically controlled valves for dynamically adjusting the damping properties of the shock absorber by adjusting the throughput of the valve.

Some known electrically controllable valves comprise a needle valve controlling fluid flow through the valve. Larger fluid pressures increase forces on the needle, which in turn leads to the need of a stronger actuator to control movement of the needle in order to open or close the valve.

It is generally advantageous to provide small valves for example in order to reduce the size of the dampers and to save cost.

A prior art valve is described in WO 2010/002314 A1. The valve comprises a needle valve controlled by an actuator. A drawback of the valve is that the actuator is slow which makes adjustment of the position of the needle slow. Another prior art device is described in US 2017/0082169.

Hence, there is a need for an electrically controlled valve which quicker reacts to control signals to quickly adapt the damping characteristics of the shock absorber comprising the valve. Also, there is a need for a smaller and less expensive valve.

SUMMARY OF THE INVENTION

Accordingly, a first aspect of the invention relates to an improved valve for a shock absorber mitigating the above-mentioned shortcomings of the prior art valves. The valve comprises a housing insertable into a first chamber of the shock absorber. The housing is provided with a portion forming a piston holder configured to extend along a central longitudinal axis of the first chamber. A piston is provided on the piston holder and configured to separate the inner volume of the first chamber into a second chamber and a third chamber. The piston comprises a primary fluid channel fluidly connecting the second and third chambers to allow for a primary fluid flow between the second and third chambers. The piston holder comprises a secondary fluid channel fluidly connecting the second and third chambers to provide for a secondary fluid flow between the second and third chambers through said fluid channel. The valve further comprises a spool movable between an open position in which the spool allows secondary fluid flow through the secondary fluid channel and a restricting position in which the spool at least partly restricts secondary fluid flow through the secondary fluid channel. The valve further comprises an electrically controlled actuator configured to move the spool between its open and restricting positions. The spool is guided in a corresponding portion of the secondary fluid channel of the piston holder for movement back and forth between the open and the closed positions. The piston holder is provided with one or more radial ports providing fluid inlets into the secondary fluid channel from the second chamber. The spool is configured to throttle the secondary fluid flow at the fluid inlets of the piston holder by gradually blocking the fluid inlets of the secondary fluid channel with an outer surface of the spool upon movement of the spool from the open position towards the restricting position, and gradually unblocking the fluid inlets of the fluid channel upon movement of the spool from the restricting position towards the open position.

In such a valve, damping fluid is routed radially into the piston holder, thereby allowing the spool to cut-off fluid flow according to the spool valve principle. By throttling the second fluid flow primarily at the inlets of the piston holder using the spool, rather than at the outlet, the pressure of the fluid contained within the piston holder and the spool is substantially constant independently of the fluid pressure in the second chamber of the first chamber. Upon unblocking of the inlet at opening of the spool, the pressure drop occurs mainly adjacent the inlet. The pressure drop should take place at a short flow path in order to make the shock absorber less prone to fading.

The one or more radial ports may in some embodiments be provided at an end portion of the piston holder, wherein the spool is provided with an inner fluid channel with a fluid inlet and a fluid outlet, the spool being configured such that the secondary fluid flow is routed through the inner fluid channel of the spool in use. Such a configuration of the valve is advantageous for fluid flows directed from the distal end portion of the piston holder inwards towards the base of the piston holder, typically during a compression stroke.

The end of the piston holder may be closed. The closed end of the piston holder promotes fluid flow through the radial inlet ports of the piston holder.

Specifically, the end of the piston holder may be closed by means of a plug provided with a substantially conical portion. The tip of the conical portion typically protrudes into the fluid channel of the spool. The conical portion of the plug guides fluid entering the valve thereby reducing turbulence and flow resistance through the valve. By providing the conical portion as a part of a plug, production of the piston holder comprising the internal cone is simplified. Further, this design provides for a modular design using plugs with differently shaped cones for different valves/spools as required.

The base of the conical portion may have a smaller diameter than the inner diameter of the piston holder. Such a conical portion enables fluid to enter substantially radially into the piston holder and redirect along the piston holder over a larger distance in a controlled manner, thereby reducing flow resistance and improving the reaction speed of the valve.

The fluid inlet opening of the spool may comprise a chamfered portion substantially parallel to the conical portion of the plug. The chamfered portion provides for a sharper distal edge of the spool and more distinct restriction of damper fluid flow.

The inlet of the spool may be provided through an end of the spool. With the provision of the inlet of the spool through an end of the spool, as opposed to a provision of the inlet as a radial hole through the wall of the spool, fluid flow and turbulence can be adjusted mainly by modifying the shape, position and number of inlets of the piston holder, since pressure drops spread around the inlet.

A pressure compensation chamber may be provided in the housing, said pressure compensation chamber being fluidly connected to the inner fluid channel of the spool by means of an auxiliary fluid channel.

The pressure compensation chamber enables pressure balancing of the spool to make the movement of the spool substantially pressure-independent. A pressure balanced spool enables use of a smaller actuator and/or a faster actuator since the actuator does not have to work as hard to overcome pressure acting on the spool.

The auxiliary fluid channel may be provided through the spool. By providing the auxiliary fluid channel through the spool, there is no need to machine a fluid channel in the housing, and thus different spool configurations can be used for one type of housing.

Alternatively, the auxiliary fluid channel may be provided in the wall of the piston holder. By providing the auxiliary fluid channel in the wall of the piston holder manufacturing of the spool is simplified.

The actuator may be a stepper motor. The stepper motor enables control of the position of the spool with no further parts, as opposed to using a solenoid which requires the spool to be biased against the force of the solenoid in order to allow control of the position of the spool.

The spool may be connected to the actuator by means of a shaft, and wherein the pressure compensation chamber is provided around the shaft. Providing the pressure compensation chamber around the shaft enables use of a simple and robust piston holder in one piece with a simple to machine inner channel/bore, whereas any extra balancing forces needed can be allocated to the portion surrounding the shaft, which is readily available for machining from the actuator-side of the housing anyways. This design of the valve is thus simple and robust.

The spool and the shaft may be cylindrical and the diameter of the shaft smaller than the diameter of the spool. The space around the shaft exposes surfaces of the spool suitable for pressure-compensation within the confines of the central bore of the piston holder. Thereby fewer machining steps are required for manufacturing of the valve, whilst the overall size and weight of the spool, as well as the valve, may be kept small.

The spool and/or the shaft may be configured such that a fluid pressure acting in the pressure compensation chamber forces the spool away from the open position towards the closed position. The pressure from the fluid in the pressure compensation chamber acts on surfaces of the spool directed so as to have a force component acting for pushing the spool in the described direction, thereby fully or partially balancing the forces caused by the fluid pressure in other portions of the valve acting on the spool for pushing the spool inwards in a direction from the closed position towards the open position.

The spool and/or the shaft may be configured such that fluid pressure acting on the spool generates a balanced force substantially not forcing the spool to move in any direction. A balanced spool enables use of smaller and/or faster stepper motors since less power is needed to control the position of the spool. For example, the diameter of the shaft can be varied to decrease the net force from the pressure compensation chamber on the spool by increasing the shaft diameter, and vice versa.

A sealing element may be provided between the shaft and the housing for isolating the pressure compensation chamber from a portion of the housing containing the actuator. The sealing element enables reliable closing of the pressure compensation chamber by surfaces of the housing, which in turn enables the net force on the spool created by the fluid pressure in the pressure compensation chamber to act in the desired direction. If the pressure compensation chamber would be a chamber within the spool itself, the net force acting on the spool would be zero.

The outlet openings of the piston holder may be sized larger than the inlet openings of the piston holder. Such configuration provides for restriction of fluid flow through the valve is mainly at the inlet of the piston holder and not at the outlet of the piston holder.

Figures 1, 2:
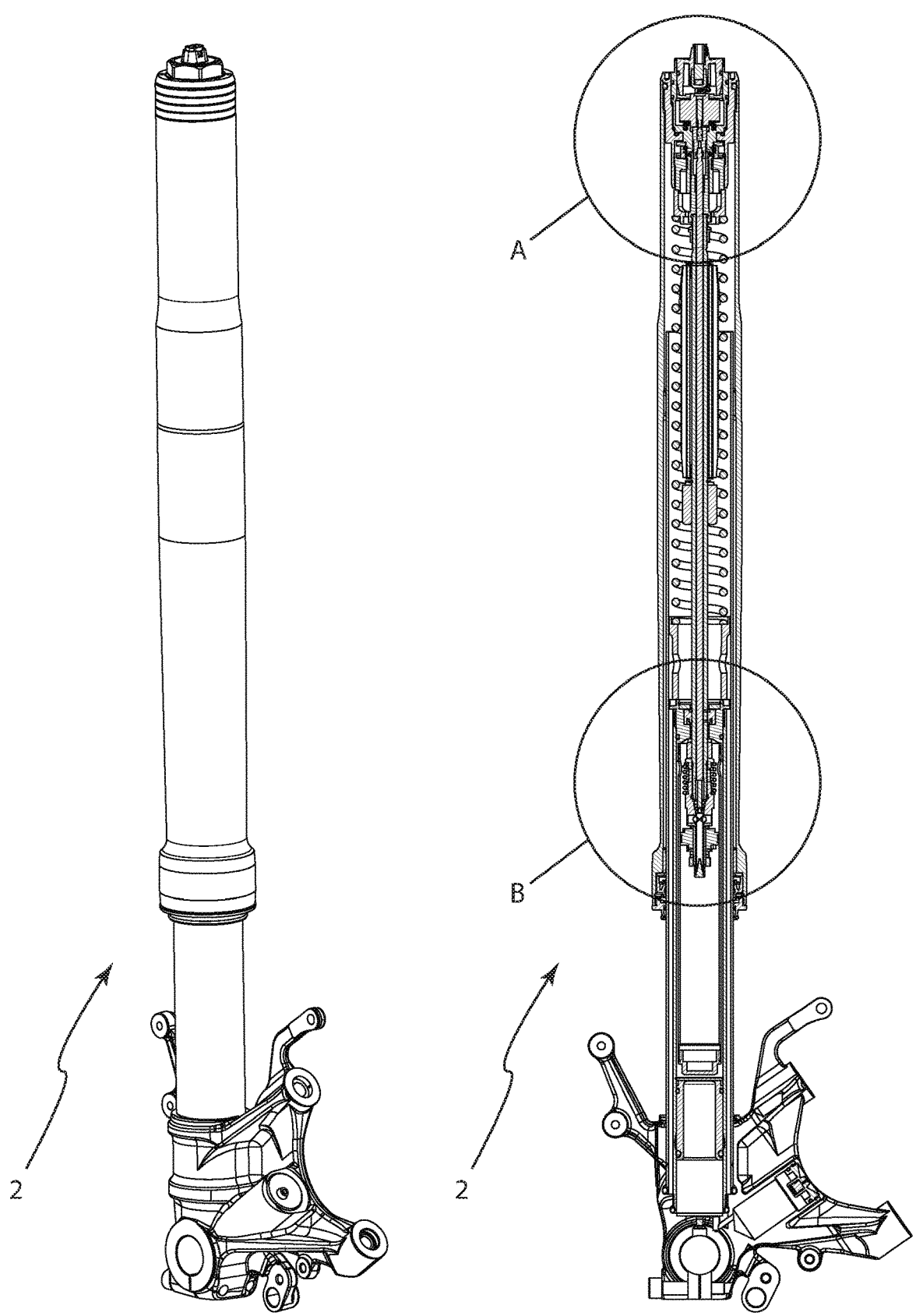
FIG. 1 shows a perspective view of a shock absorber for a front fork or a vehicle, such as a motorcycle, shown with an electrical connector at the upper portion of the shock absorber for control of the damping characteristics of the shock absorber.
FIG. 2 shows a cross-sectional view of the shock absorber also shown in FIG. 1. The shock absorber comprises a valve according to a first embodiment of the invention.

The following reference numerals are used throughout the description and claims. It should be noted that reference numeral 1 refers generally to the inventive valve, whereas 1*a* and 1*b* refer directly to each respective one of the two disclosed embodiments.

| | |
|---|---|
| 1 | valve |
| 2 | shock absorber |
| 3 | housing of valve |
| 4 | first chamber of shock absorber |
| 5 | piston holder |
| 6 | central longitudinal axis of first chamber |
| 7 | piston |
| 8 | first chamber |
| 9 | second chamber |
| 10 | primary fluid channel (of piston) |
| 11 | secondary fluid channel (of piston holder) |
| 12 | spool |
| 13 | electrically controlled actuator |
| 14 | inner fluid channel of spool |
| 15 | inlet of inner fluid channel of spool |
| 16 | outlet of inner fluid channel of spool |
| 17 | end portion of piston holder |
| 18 | fluid inlets |
| 19 | pressure compensation chamber |
| 20 | auxiliary fluid channel |
| 21 | shaft |
| 22 | primary fluid flow |
| 23 | secondary fluid flow |

DETAILED DESCRIPTION

The disclosed embodiments will hereinafter be described in more detail with reference to the accompanying drawings in which several embodiments of the invention are shown. However, the invention may be embodied in many different forms and should not be construed as limited to the embodiments set forth herein. Rather, these embodiments are provided by way of example so that this disclosure will be thorough and complete, and will fully convey the scope of the invention to those skilled in the art. Like numbers refer to like elements throughout the description.

Figure 5:
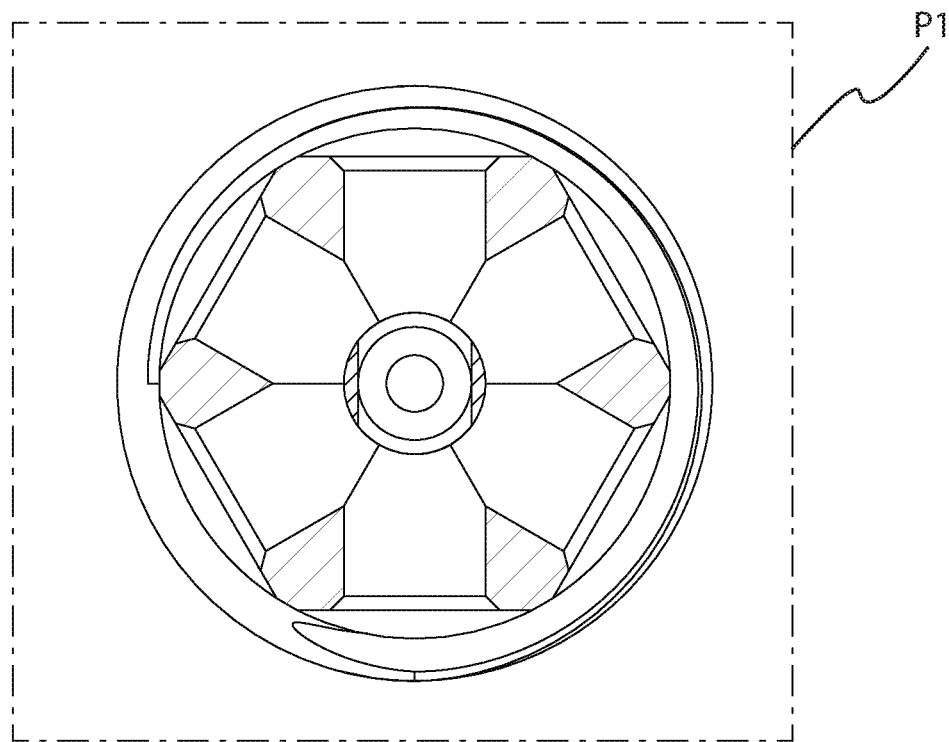
FIG. 5 is a cross sectional view in plane P1 showing an enlarged detail of the outlets of the inner fluid channel of the spool, and of the outlets of the secondary fluid passage of the piston holder.
Figure 6:
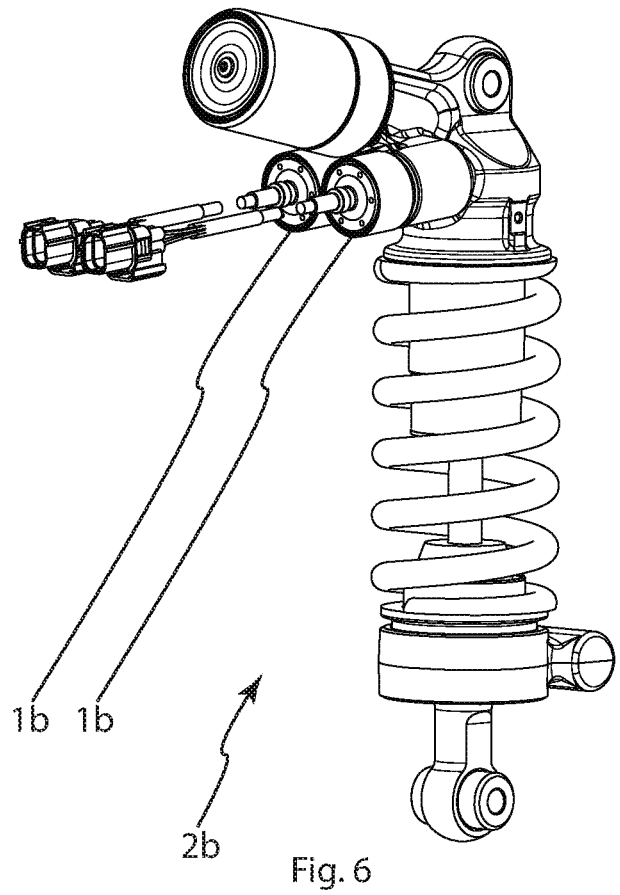
FIG. 6 shows a perspective view of a shock absorber for a rear swing arm of a vehicle, such as a motorcycle, shown with two valves according to the invention, and respective electrical connectors shown for illustrative purposes as detached from at the respective valves, although they in reality are connected to each respective valve.
Figure 7:
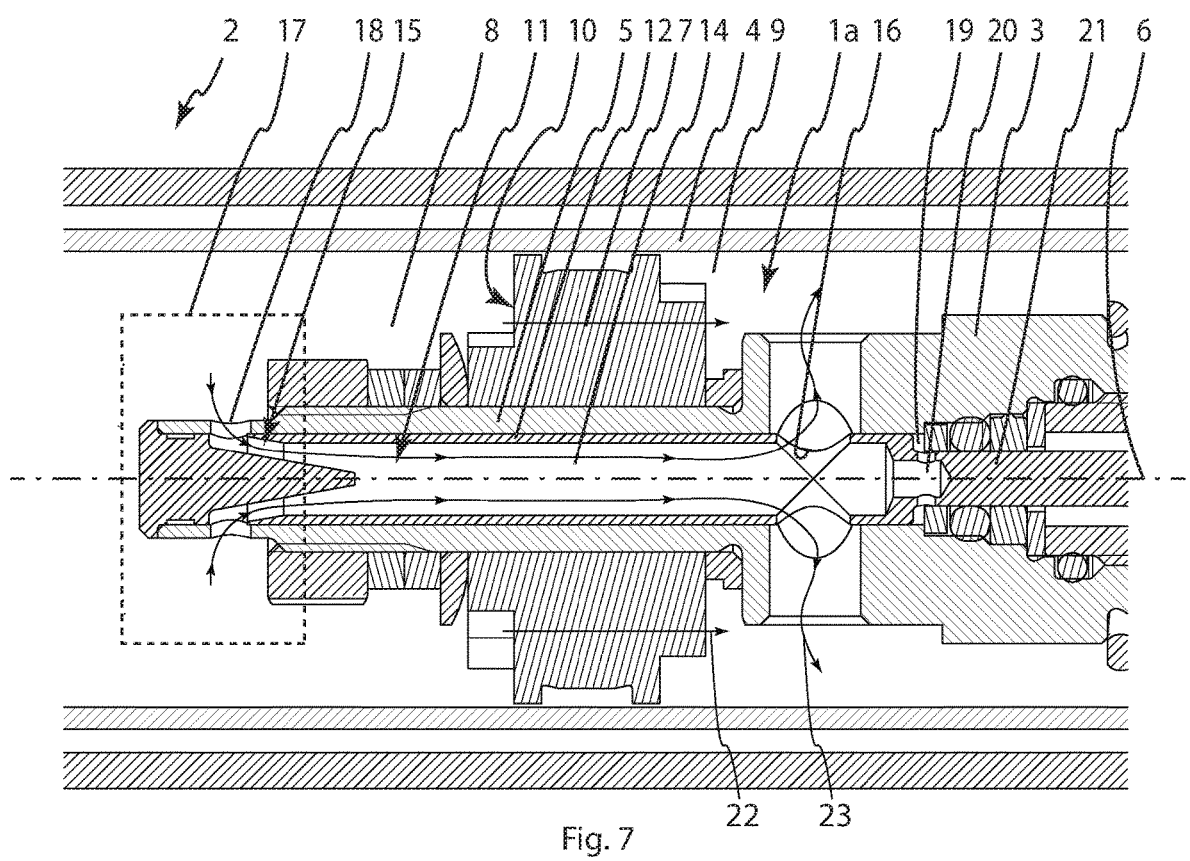
FIG. 7 show a cross-sectional view in perspective of a portion of a valve according to a first embodiment of the invention fitted within a first chamber of the shock absorber of FIGS. 1-4. Note that the actuator is not shown, as it is outside the bounds of the figure, but the actuator is shown in FIGS. 2 and 3 enlarged portion A.

A shock absorber 2 comprising a valve according to a first embodiment of the invention is shown in FIGS. 1-4 and 6. A valve according to a second embodiment of the invention is shown in FIGS. 5 and 7.

The shock absorber 2 of FIGS. 1-4 is typically used for damping the movement of a front wheel of a motorcycle, although other uses are possible. The damper uses a known twin tube design to route damping fluid during compression and rebound stroke of the shock absorber past one or more valves controlling fluid flow in the damper. The inventive valve is shown in more detail in FIGS. 4 and 6.

The valve 1 comprises a housing 3 inserted into a first chamber 4 of the shock absorber 2.

The first chamber may in some embodiment correspond to the working chamber of the shock absorber. In other embodiments, the first chamber may correspond to an auxiliary chamber in fluid connection with the working chamber of the shock absorber, such as a space formed in an upper portion of the housing of the shock absorber as shown in FIG. 6. In other embodiments, the first chamber may be some other chamber of the shock absorber, through which damping fluid is routed in use.

The housing 3 is provided with a portion forming a piston holder 5 configured to extend along a central longitudinal axis 6 of the first chamber 4. A piston 7 is provided on the piston holder 5 and configured to separate the inner volume of the first chamber 4 into a second chamber 8 and a third chamber 9. The piston 7 comprises a primary fluid channel 10 fluidly connecting the second 8 and third 9 chambers to allow for a primary fluid flow 22 between the second 8 and third 9 chambers. The piston holder 5 comprises a secondary fluid channel 11 fluidly connecting the second 8 and third 9 chambers to provide for a secondary fluid flow 23 between the second 8 and third 9 chambers through said secondary fluid channel 11. The valve 1 further comprises a spool 12 movable between an open position in which the spool 12 allows secondary fluid flow through the secondary fluid channel 11 and a restricting position in which the spool 12 at least partly restricts secondary fluid flow through the secondary fluid channel 11.

The primary fluid flow is controlled by the fluid resistance characteristic of the piston 7, such as the size and number of holes defining the fluid channels of the piston, and optional provision of one or more shims covering the holes. The disclosed valve 1a of the first embodiment comprises a number of holes distributed around the piston and a shim stack covering the holes. A similar piston arrangement is provided for other embodiments of the inventive valve.

In order to further control damping fluid flow through the valve, the secondary fluid flow is adjustable by movement of the spool 12 between said open and restricting positions. In the open position, the valve is preferably fully open such that a larger secondary fluid flow is enabled. In the restricting position of the spool, the flow path of the secondary fluid flow is reduced by the spool, such that only a smaller fluid flow is allowed. In some embodiments, the spool in its restricting position fully blocks the secondary fluid flow.

Figure 3:
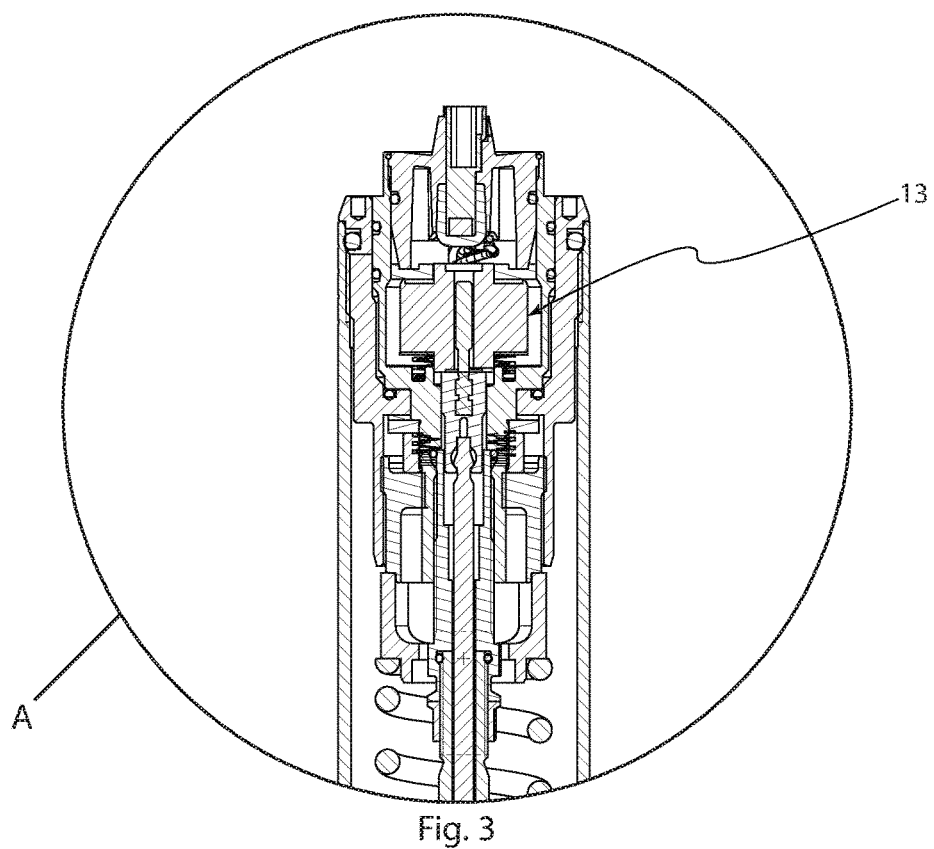
FIG. 3 shows an enlarged detail view of a first portion A of the shock absorber also shown in FIGS. 1 and 2.
Figure 4:
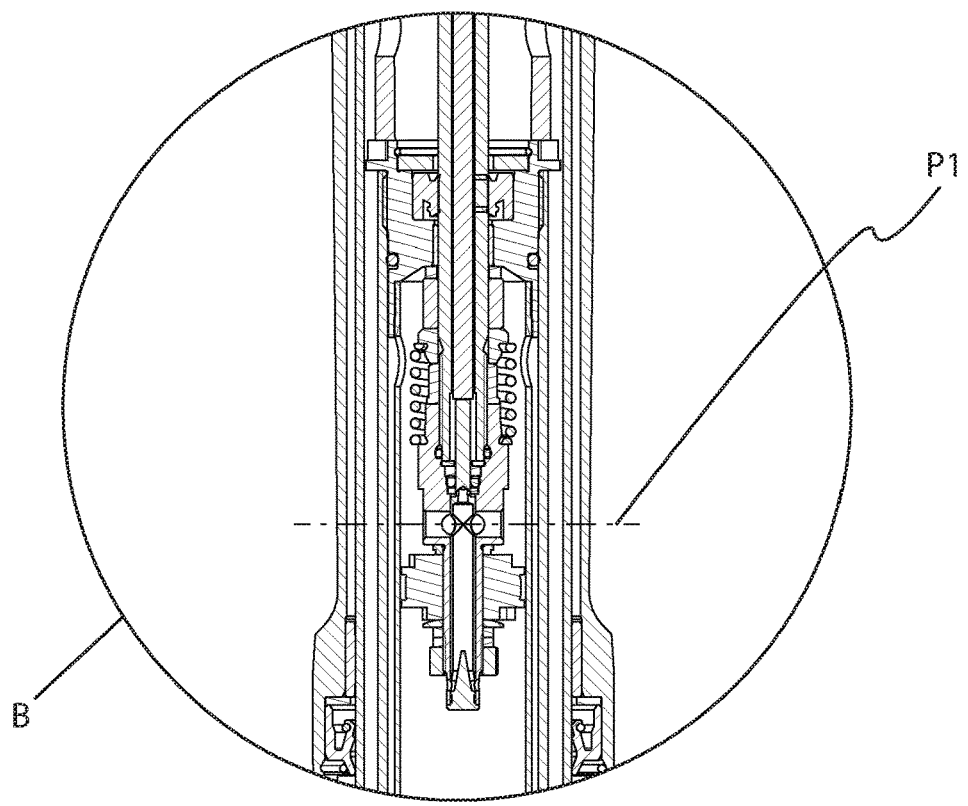
FIG. 4 shows an enlarged detail view of a second portion B of the shock absorber also shown in FIGS. 1, 2 and 3.

In order to control the movement of the spool 12, the valve 1 comprises an electrically controlled actuator 13. In the embodiments of FIGS. 1-7, the actuator is provided at an end portion A of the damper as illustrated in FIG. 3. By providing the actuator 13 at an end portion of the actuator 13, electric cables need not be routed far through the damper to reach the actuator. In other embodiments, the actuator could be arranged further into the damper with cables routed to the actuator through the damper.

The actuator 13 is configured to move the spool 12 between its open and its restricting positions. The spool 12 is guided in a corresponding portion of the secondary fluid channel 11 of the piston holder 5 for movement between the open and the closed positions, typically a movement back and forth between various intermediate positions as governed by the actuator to vary fluid resistance of the valve. In the embodiments of FIGS. 1-7, the piston holder has a substantially cylindrical shape, typically manufactured by turning. Also, the secondary fluid channel is made by drilling, and thus has a hole shape matching a cylindrical outer surface of the spool. In other embodiments, the secondary fluid channel may instead have some other cross-sectional shape, such as one with elliptical cross-section, wherein the spool would have a corresponding shape with an elliptical cross-section. In any case, the spool has to be movable between its open and restricting positions, and has to seal against the surrounding inner surface of the secondary fluid channel, such that the secondary fluid flow is routed through the spool rather than leaking past the spool in-between the spool and the piston holder, around the spool.

Thus, the spool 12 is provided with an inner fluid channel 14 with a fluid inlet 15 and a fluid outlet 16. The spool 12 is configured such that the secondary fluid flow is routed through the inner fluid channel 14 of the spool 12 in use. An end portion 17 of the piston holder 5 is provided with one or more radial ports providing fluid inlets 18 into the fluid channel 11 from the second chamber 8. The spool 12 is configured to throttle the secondary fluid flow at the fluid inlets 18 of the piston holder 5 by gradually blocking the fluid inlets 18 of the secondary fluid channel 11 with the cylindrical, or otherwise shaped, outer surface of the spool 12 upon movement of the spool 12 from the open position towards the restricting position, and gradually unblocking the fluid inlets 18 of the fluid channel 11 upon movement of the spool 12 from the restricting position towards the open position. As shown in FIG. 5, the outlets of the inner fluid channel of the spool are surrounded by a continuous space formed by the six holes forming the outlets of the secondary fluid passage of the piston holder. Since fluid can flow between the inner channel of the spool and the continuous space formed by the outlets, the spool is allowed to be arbitrarily rotated relative to the housing without negatively affecting fluid flow through the outlet. It should be noted that for some embodiments the spool is allowed to rotate relative to the housing, whilst in other embodiments the spool is directly or indirectly prevented from rotating relative to the housing. The design choice is largely depending on the choice of actuator. The main considerations affecting design is if a captive or a non-captive stepper motor is used. For example, in embodiments in which a non-captive stepper motor is used, the spool must be directly or indirectly prevented from rotating in order for the torque of the stepper motor to be able to feed the spool between its open and restricting positions. One means for preventing relative rotation between spool and housing is to provide a ball in mutual track of the spool and the housing.

Figure 8:
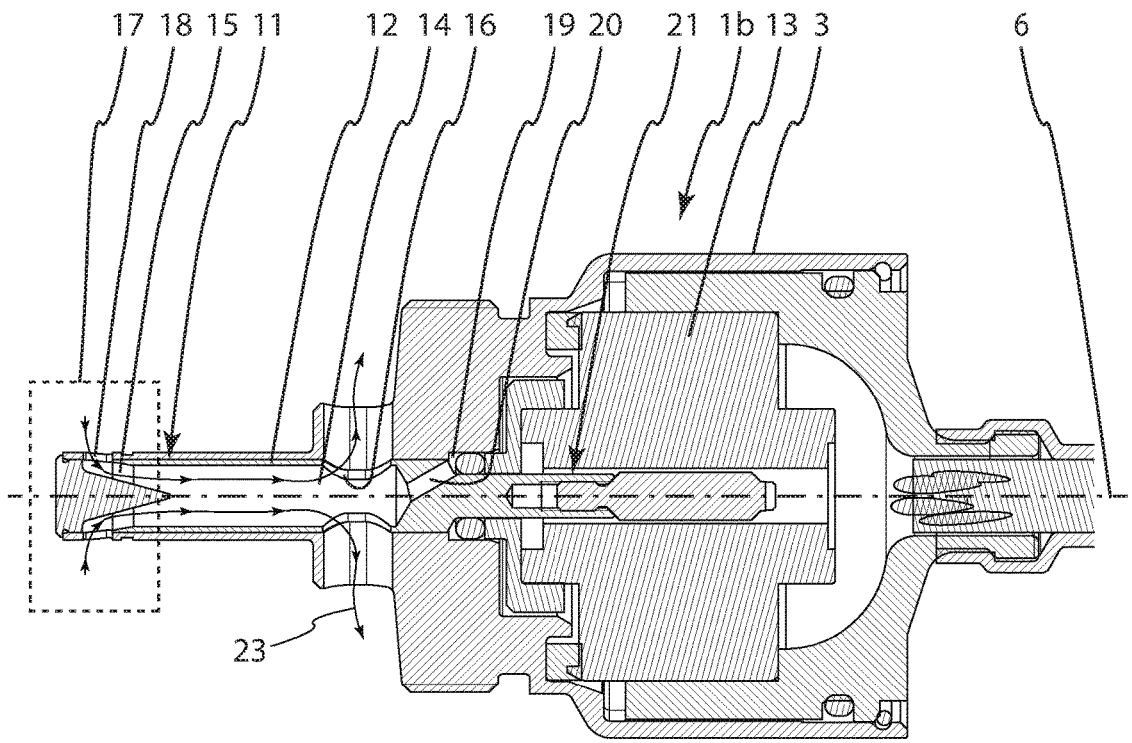
FIG. 8 show a cross-sectional view in perspective of a valve according to a second embodiment of the invention fitted within a first chamber of the rear shock absorber of FIG. 6. Note that the actuator is shown but not the piston normally attached to the piston holder in the left hand portion of FIG. 8. However, the piston has the same basic design and function as that of FIG. 7.

As best shown in FIGS. 7-8, the end of the piston holder 5 is closed by means of a plug. The plug is provided with a substantially conical portion with the tip of the conical portion protruding into the fluid channel 11 of the spool 12. The closed end of the piston holder routes fluid flow through the radial ports of the piston holder, in contrast to a piston holder with an open end, which would have allowed fluid flow also through an axial opening of the piston holder.

Alternatively, the closed end may be integrally formed with the rest of the piston holder, such as by drilling the secondary fluid channel from the actuator-end of the housing, only partly through the housing so that there is no need to plug the end. The conical portion of the plug could thus alternatively be machined as an integral portion of the housing rather than as a part of a plug, for example by milling. However, milling is not suitable and may not even be possible so far into the elongate piston holder from the actuator-end of the housing.

By using the plug to provide a closed end of the piston holder, manufacturing of the conical portion is made easier since the conical portion of the plug can be made by turning. Thus, by providing the conical portion as a part of a plug, production of the piston holder comprising the internal cone is thus simple and inexpensive. Further, this design provides for a modular design using plugs with differently shaped cones for different valves or intended characteristics of the valves on a case-by-case basis.

In the embodiments of FIGS. 1-7, the base of the conical portion has a smaller diameter than the inner diameter of the piston holder. Such a cone enables fluid to enter substantially radially into the piston holder and redirect along the piston holder over a larger distance in a controlled manner, thereby reducing flow resistance and improving the reaction speed of the valve. In other embodiments, the cone could have the same diameter as the inner diameter of the piston holder.

The fluid inlet opening of the spool 12 comprises a chamfered portion substantially parallel to the conical portion of the plug. The chamfered portion provides for a sharper distal edge of the spool, which in turn provides for increased turbulence by the inlets adjusted by the spool. The inlet 15 of the spool 12 is provided through an end of the spool 12, substantially centrally along the longitudinal axis of the spool.

With the provision of the inlet of the spool through an end of the spool, as opposed to a provision of the inlet as a hole through the side wall of the spool, such as a radial hole, fluid flow and turbulence can be adjusted mainly by modifying the shape, position and number of inlets of the piston holder. Pressure drops spread around the inlet of the spool and damping fluid flow can easily be cut off by the continuous edge portion surrounding the inlet of the spool. Hence, no rotational alignment is needed between the radial inlets of the piston rod and the spool about the longitudinal axis of the spool since the inlet of the inner channel 14 of the spool is symmetric about the longitudinal axis of the spool, thereby providing increased freedom of positioning the radial ports/inlets of the piston holder.

As best shown in FIGS. 7 and 8, a pressure compensation chamber 19 is provided in the housing 3, the pressure compensation chamber 19 is fluidly connected to the inner fluid channel 14 of the spool 12 by means of a fluid channel herein called auxiliary fluid channel 20. The pressure compensation chamber enables pressure balancing of the spool to make movement of the spool substantially pressure-independent. A pressure balanced spool enables use of a smaller actuator or a faster actuator since the actuator does not have to work as hard to overcome pressure acting on the spool. If no pressure compensation chamber would be used, an increase of the pressure inside the spool would lead to an increased net force acting on the spool to force it towards its open position. With the pressure compensation chamber, fluid inside the pressure compensation chamber will have the same pressure as fluid in contact with the secondary fluid channel such that the net force of the pressure acting on the secondary fluid channel can be compensated by forces by a force acting in the opposite direction. Hence, the pressure compensation chamber enables a total net force of the fluid in contact with the spool to be adjusted by altering the size and shape of the pressure compensation chamber. The specific configuration and positioning of the pressure compensation chamber and the auxiliary fluid channel can be varied within the scope of the invention, as would be understood by the skilled person.

The auxiliary fluid channel 20 is provided through the spool 12. By providing the auxiliary fluid channel through the spool, there is no need to machine a fluid channel in the housing, and thus different spool configurations can be used for one type of housing. Alternatively, the auxiliary fluid channel 20 could in other embodiments be provided in the wall of the piston holder 5, for example as a recess extending along the length of the spool, such that the auxiliary fluid channel is formed between the outside of the spool and the recess in the inner surface of the spool.

By providing the auxiliary fluid channel in the wall of the piston holder 5, manufacturing of the spool 12 is simplified. In the illustrated embodiments, the actuator is a stepper motor. The stepper motor enables control of the position of the spool with no further parts, as opposed to using a solenoid which requires the spool to be biased against the force of the solenoid in order to allow control of the position of the spool, for example using a spring. That said, the actuator could alternatively be a solenoid instead of a stepper motor.

The spool 12 is connected to the actuator 13 by means of a shaft 21. The shaft is an integral portion of the spool 12, but may in other embodiments contain separate parts joined to the spool 12 by any suitable means, such as threads, press fit, punching or welding. In the first embodiment or FIGS. 1-4 and 6, the spool 12 is connected to the actuator by means of a long shaft. The pressure compensation chamber 19 is provided around the shaft 21. In the disclosed embodiment, the pressure compensation chamber 19 is formed in a space formed between the cylindrical inner surface of the piston holder also forming the secondary fluid channel, i.e. the same bore. In other embodiments where a larger balancing force from the pressure compensation chamber is needed, a larger diameter space may be formed outside the main bore forming the secondary fluid channel.

Providing the pressure compensation chamber around the shaft enables use of a simple and robust piston holder in one piece with a simple-to-machine inner channel/bore. Since the shaft connecting the spool 12 and the actuator has a smaller diameter than the spool 12, the net force of fluid pressure in the pressure compensation chamber of the spool 12 is directed such that it forces the spool 12 in a direction away from the actuator. The pressure from the damping fluid in the pressure compensation chamber acts on surfaces of the spool directed so as to have a force component acting for pushing the spool in the described direction, thereby fully or partially balancing the forces caused by the fluid pressure in other portions of the valve acting on the spool for pushing the spool inwards in a direction from the closed position towards the open position.

Hence, the spool 12 and the shaft 21 are configured such that fluid pressure acting on the spool 12 generates a balanced force substantially not forcing the spool 12 to move in any direction. A balanced spool enables use of a smaller and faster actuator/stepper motor since less power is needed to control the position of the spool.

A sealing element being an O-ring, is provided between the shaft 21 and the housing 3 for isolating the pressure compensation chamber 19 from other portions of the housing, such as a portion of the housing 3 in some embodiments containing the actuator 13.

Also, the outlet openings of the piston holder 5 are sized larger than the outlet openings of the spool 12 such that fluid flow through the valve is mainly restricted at the inlet of the piston holder and not at the outlet of the piston holder.

By restricting fluid flow through the valve mainly at the inlet of the spool, the behavior of the valve consistent and predictable.

Although less advantageous, the valve could in alternative embodiments be configured such that fluid flow is restricted evenly at the inlet and the outlet of the secondary fluid channel, or even mainly at the outlet of the secondary fluid channel.

The shock absorber 2b of FIG. 6 for a rear swing arm of a vehicle, such as a motorcycle, is provided with two valves 1b according to a second embodiment of the invention as shown in FIG. 7. The valve 1b functions in the same way as the valve 1/1a of the first embodiment described above and shown in FIGS. 1-5 and 8. A difference is the shorter shaft connecting the actuator and the spool. It should also be noted that in FIG. 8, the valve 1b is shown without the piston 7 mounted on the piston holder 5. However, a piston 7 is indeed provided also in this second embodiment of the invention and hence also a primary fluid flow 22. A further difference is the shape of the housing which in this second embodiment houses also the actuator but which in the first embodiment of FIGS. 1-5 and 7 houses only other features of the invention, such as the secondary fluid channel and the spool.

Figures 9, 10:
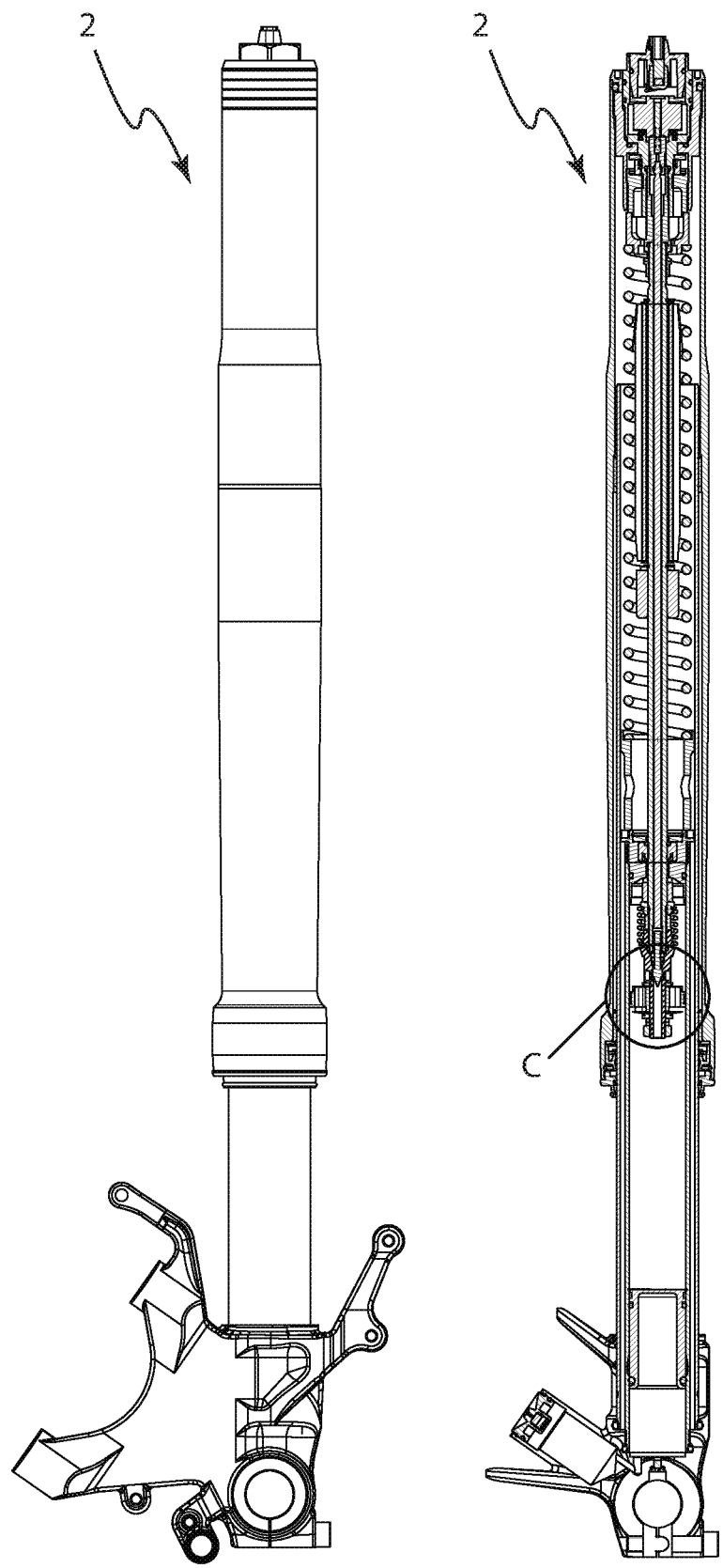
FIG. 9 shows a side view of a damper provided with a valve according to a third embodiment of the invention.
FIG. 10 shows the damper of FIG. 9 in cross-section.
Figure 11:
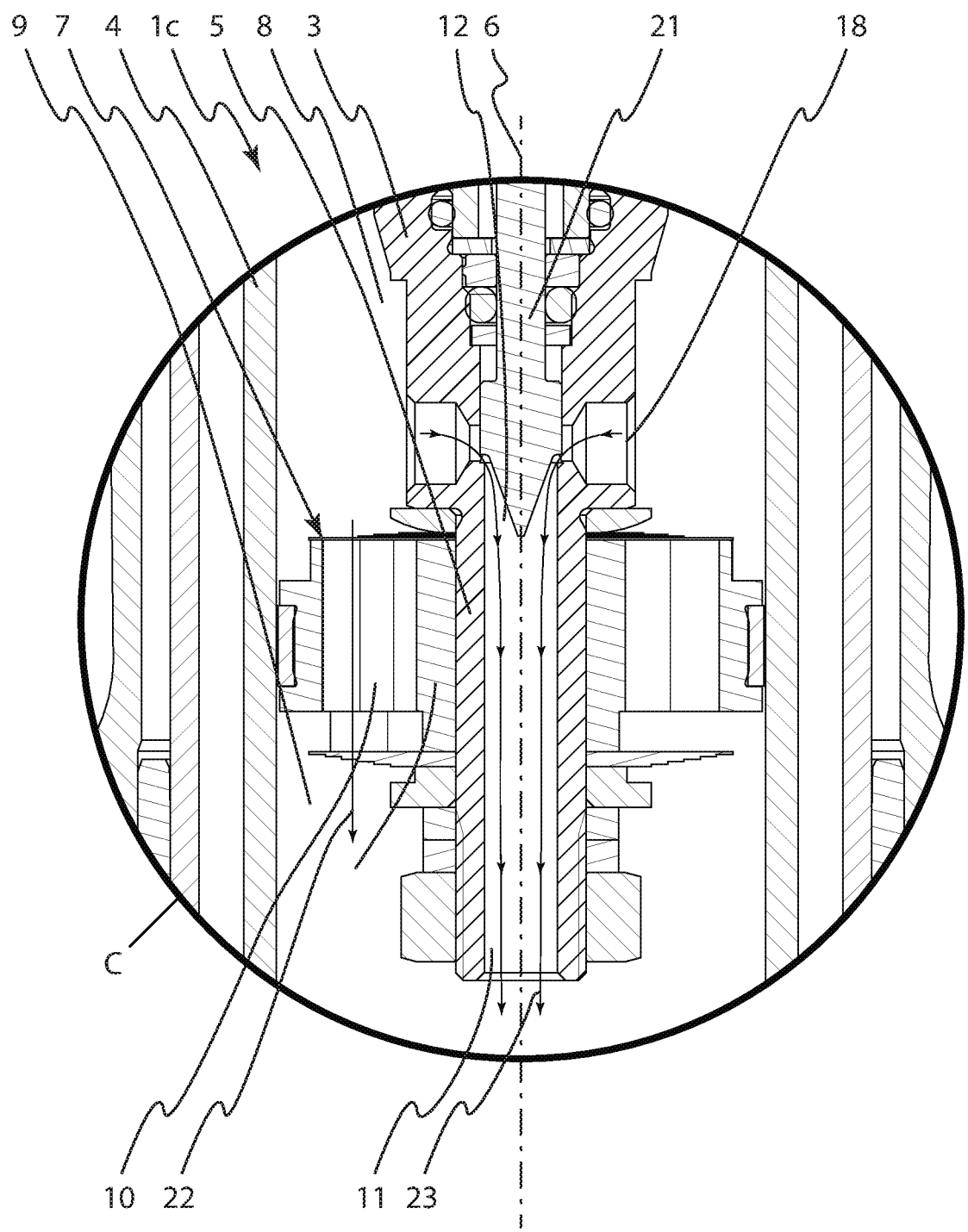
FIG. 11 shows the valve according to the third embodiment of the invention. As shown, the inlet of the secondary fluid channel is provided at an inner portion of the piston holder for controlling rebound flow of the damper fluid. In this embodiment, the secondary fluid flow is not routed through the spool but directly through the secondary fluid channel of the piston holder.
Figure 12:
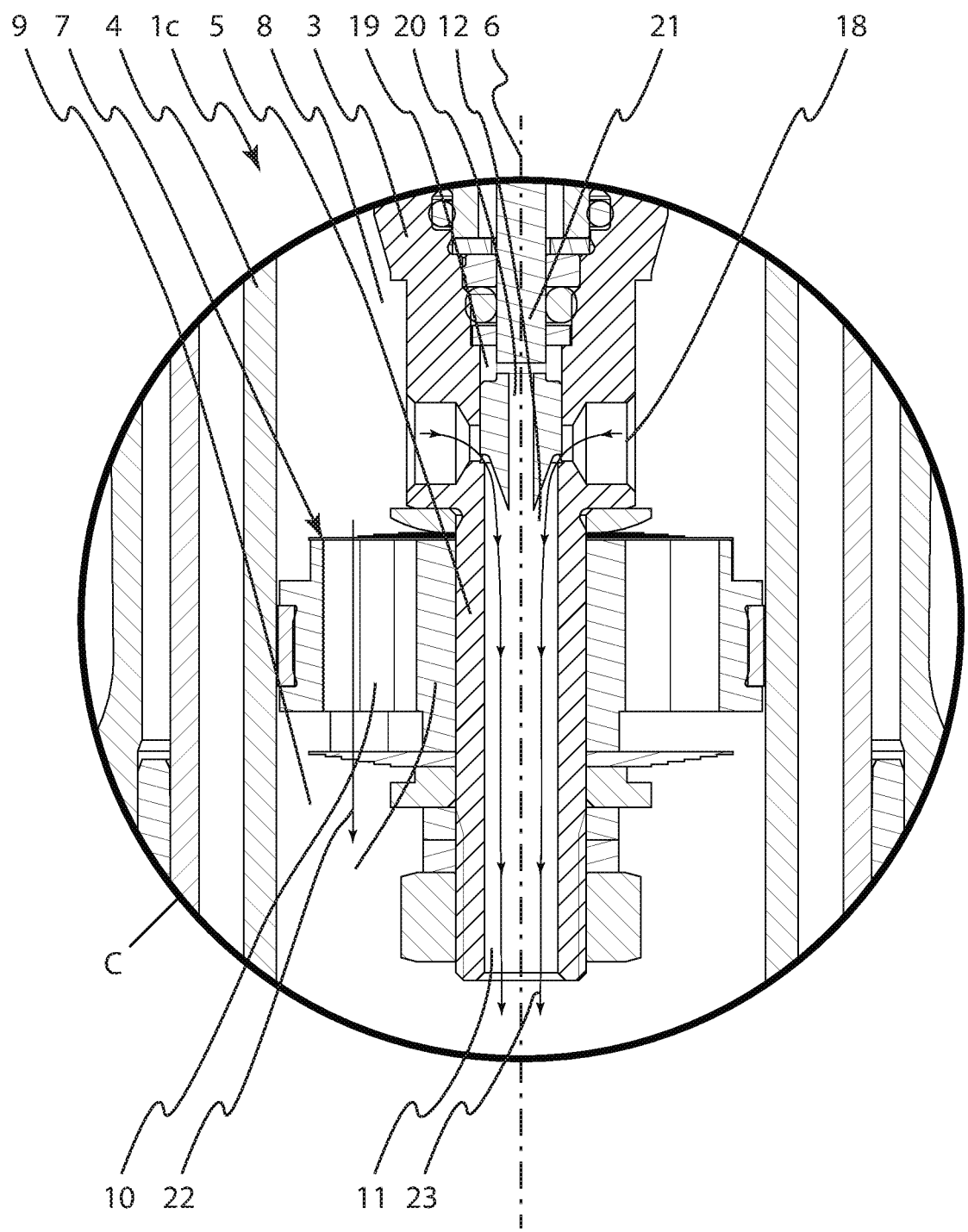
FIG. 12 shows an alternative embodiment of the valve shown in FIG. 11, further provided with a pressure compensation system for balancing fluid forces acting on the spool.

A valve according to a third embodiment of the invention is shown in FIGS. 9-11 with an alternative embodiment in FIG. 12 comprising a pressure compensation system with an auxiliary fluid channel 20 connecting a pressure compensation chamber 19 to the secondary fluid channel 11 through the spool 12. The valve 1c according to the third embodiment of the invention functions similar to the valve of the first two embodiments 1a, 1b described above, but is adapted for damper fluid flows in the opposite directions. As such, the secondary fluid flow is restricted at the opposite side of the piston as compared to the other two embodiments. The spool restricts the secondary fluid flow at the end portion of the spool and retracts the end portion to unrestrict the secondary fluid flow which then flows directly through the secondary fluid channel of the piston holder without being routed through the spool. As shown in FIG. 11, the restricting end of the spool is provided with a conical portion. The conical portion guides the secondary fluid flow 23 into the secondary fluid channel 11. Additionally, the valve arrangement of this third embodiment also has the possibility of being used for flow in both directions. As such, it can be used for rebound damping in a front fork but also for compression damping in front fork and for rebound and compression damping in a shock absorber.

In the above described embodiments of the invention, the piston of the valve is static within the first chamber when the shock absorber works, i.e. when a primary piston, for example connected to a wheel of a motorcycle, is moved through a working chamber of the shock absorber in use. A shock movement of the primary piston causes a pressure increase in the first chamber, for example the working chamber, which in turn forces damping fluid through the inventive valve or valves of the shock absorber, whilst the piston of the valve remains static relative to the first chamber.

The invention claimed is:

1. A valve for a shock absorber, wherein the valve comprises a housing at least partly insertable into a first chamber of the shock absorber, wherein the housing is provided with a portion forming a piston holder configured to extend along a central longitudinal axis of the first chamber, wherein a piston is provided on the piston holder and configured to separate the inner volume of the first chamber into a second chamber and a third chamber, wherein the piston comprises a primary fluid channel fluidly connecting the second and third chambers to allow for a primary fluid flow between the second and third chambers, wherein the piston holder comprises a secondary fluid channel fluidly connecting the second and third chambers to provide for a secondary fluid flow between the second and third chambers through the secondary fluid channel, wherein the valve further comprises a spool provided with an inner fluid channel with a fluid inlet and a fluid outlet, wherein the fluid inlet is provided through the end of the spool, the spool being movable between an open position in which the spool allows secondary fluid flow through the secondary fluid channel and a restricting position in which the spool at least partly restricts secondary fluid flow through the secondary fluid channel, wherein the valve further comprises an electrically controlled actuator configured to move the spool between its open and restricting positions, wherein the spool is guided in a corresponding portion of the secondary fluid channel of the piston holder for movement back and forth between the open and the closed restricting positions, wherein the piston holder is provided with one or more radial ports providing fluid inlets into the secondary fluid channel from the second chamber, and wherein the spool is configured to throttle the secondary fluid flow at the fluid inlets of the piston holder by gradually blocking the fluid inlets of the secondary fluid channel with an outer surface of the spool upon movement of the spool from the open position towards the restricting position, and gradually unblocking the fluid inlets of the secondary fluid channel upon movement of the spool from the restricting position towards the open position.

2. The valve according to claim 1, wherein the one or more radial ports are provided at an end portion of the piston holder and the spool being configured such that the secondary fluid flow is routed through the inner fluid channel of the spool in use.

3. The valve according to claim 2, wherein the end of the piston holder is closed.

4. The valve according to claim 3, wherein the end of the piston holder is closed by means of a plug provided with a substantially conical portion with a tip of the conical portion protruding into the inner fluid channel of the spool.

5. The valve according to claim 4, wherein a base of the conical portion has a smaller diameter than the inner diameter of the piston holder.

6. The valve according to claim 4, wherein the fluid inlet opening of the spool comprises a chamfered portion substantially parallel to the conical portion of the plug.

7. The valve according to claim 2, wherein a pressure compensation chamber is provided in the housing, said pressure compensation chamber being fluidly connected to the inner fluid channel of the spool by means of an auxiliary fluid channel.

8. The valve according to claim 7, wherein the auxiliary fluid channel is provided through the spool.

9. The valve according to claim 1, wherein the actuator is a stepper motor.

10. The valve according to claim 1, wherein the spool is connected to the actuator by means of a shaft, and wherein a pressure compensation chamber is provided around the shaft.

11. The valve according to claim 10, wherein the spool and the shaft are cylindrical and wherein the diameter of the shaft is smaller than the diameter of the spool.

12. The valve according to claim 10, wherein the spool and/or the shaft are configured such that a fluid pressure acting in the pressure compensation chamber forces the spool away from the open position towards the restricting position.

13. The valve according to claim 10, wherein the spool and/or the shaft are configured such that fluid pressure acting on the spool generates a balanced force substantially not forcing the spool to move in any direction.

14. A valve for a shock absorber, wherein the valve comprises a housing at least partly insertable into a first chamber of the shock absorber, wherein the housing is provided with a portion forming a piston holder configured to extend along a central longitudinal axis of the first chamber, wherein a piston is provided on the piston holder and configured to separate the inner volume of the first chamber into a second chamber and a third chamber, wherein the piston comprises a primary fluid channel fluidly connecting the second and third chambers to allow for a primary fluid flow between the second and third chambers, wherein the piston holder comprises a secondary fluid channel fluidly connecting the second and third chambers to provide for a secondary fluid flow between the second and third chambers through the secondary fluid channel, wherein the valve further comprises a spool movable between an open position in which the spool allows secondary fluid flow through the secondary fluid channel and a restricting position in which the spool at least partly restricts secondary fluid flow through the secondary fluid channel, wherein the valve further comprises an electrically controlled actuator configured to move the spool between its open and restricting positions, wherein the spool is guided in a corresponding portion of the secondary fluid channel of the piston holder for movement back and forth between the open and the restricting positions, wherein the piston holder is provided with one or more radial ports at an end thereof, providing fluid inlets into the secondary fluid channel from the second chamber, wherein the spool is configured to throttle the secondary fluid flow at the fluid inlets of the piston holder by gradually blocking the fluid inlets of the secondary fluid channel with an outer surface of the spool upon movement of the spool from the open position towards the restricting position, and gradually unblocking the fluid inlets of the secondary fluid channel upon movement of the spool from the restricting position towards the open position, wherein the end of the piston holder is closed by means of a plug provided with a substantially conical portion with a tip of the conical portion protruding into the inner fluid channel of the spool, and wherein the fluid inlet opening of the spool comprises a chamfered portion substantially parallel to the conical portion of the plug.

15. A valve for a shock absorber, wherein the valve comprises a housing at least partly insertable into a first chamber of the shock absorber, wherein the housing is provided with a portion forming a piston holder configured to extend along a central longitudinal axis of the first chamber, wherein a piston is provided on the piston holder and configured to separate the inner volume of the first chamber into a second chamber and a third chamber, wherein the piston comprises a primary fluid channel fluidly connecting the second and third chambers to allow for a primary fluid flow between the second and third chambers, wherein the piston holder comprises a secondary fluid channel fluidly connecting the second and third chambers to provide for a secondary fluid flow between the second and third chambers through the secondary fluid channel, wherein the valve further comprises a spool provided with an inner fluid channel with a fluid inlet and a fluid outlet, wherein the fluid inlet is provided through the end of the spool, the spool being movable between an open position in which the spool allows secondary fluid flow through the secondary fluid channel and a restricting position in which the spool at least partly restricts secondary fluid flow through the secondary fluid channel, wherein the valve further comprises an electrically controlled actuator configured to move the spool between its open and restricting positions, wherein the spool is guided in a corresponding portion of the secondary fluid channel of the piston holder for movement back and forth between the open and the closed restricting positions, wherein the piston holder is provided with one or more radial ports at an end thereof, providing fluid inlets into the secondary fluid channel from the second chamber, wherein the spool is configured to throttle the secondary fluid flow at the fluid inlets of the piston holder by gradually blocking the fluid inlets of the secondary fluid channel with an outer surface of the spool upon movement of the spool from the open position towards the restricting position, and gradually unblocking the fluid inlets of the secondary fluid channel upon movement of the spool from the restricting position towards the open position, and wherein a pressure compensation chamber is provided in the housing, said pressure compensation chamber being fluidly connected to the inner fluid channel of the spool by means of an auxiliary fluid channel.

\* \* \* \* \*